(12) United States Patent
Riskas

(10) Patent No.: US 9,222,493 B2
(45) Date of Patent: Dec. 29, 2015

(54) STATICALLY STABLE WALKING MACHINE AND POWER SYSTEM THEREFOR

(71) Applicant: Brian Riskas, Henderson, NV (US)

(72) Inventor: Brian Riskas, Henderson, NV (US)

(*) Notice: Subject to any disclaimer, the term of this patent is extended or adjusted under 35 U.S.C. 154(b) by 0 days.

(21) Appl. No.: 14/513,931

(22) Filed: Oct. 14, 2014

(65) Prior Publication Data

US 2015/0101871 A1     Apr. 16, 2015

Related U.S. Application Data

(60) Provisional application No. 61/890,508, filed on Oct. 14, 2013, provisional application No. 61/900,242, filed on Nov. 5, 2013.

(51) Int. Cl.
*F15B 21/08*     (2006.01)
*B62D 57/032*     (2006.01)

(52) U.S. Cl.
CPC ............. *F15B 21/085* (2013.01); *B62D 57/032* (2013.01)

(58) Field of Classification Search
CPC ............................ F15B 21/085; B62D 57/032
USPC .......................................................... 180/8.1
See application file for complete search history.

(56) References Cited

U.S. PATENT DOCUMENTS

| | | | |
|---|---|---|---|
| 4,080,850 A | | 3/1978 | Bubula |
| 4,425,759 A | | 1/1984 | Krusche |
| 4,558,758 A | * | 12/1985 | Littman et al. .................. 180/8.1 |
| 4,565,487 A | * | 1/1986 | Kroczynski .................... 414/730 |
| 4,662,465 A | * | 5/1987 | Stewart .......................... 180/8.1 |
| 5,121,805 A | * | 6/1992 | Collie ............................ 180/8.1 |
| 5,685,383 A | * | 11/1997 | Ferrante ........................ 180/8.6 |
| 5,758,734 A | * | 6/1998 | Hong et al. .................... 180/8.1 |

(Continued)

FOREIGN PATENT DOCUMENTS

| | | |
|---|---|---|
| CN | 102749919 | 10/2012 |
| GB | 1365538 | 9/1974 |
| WO | 2010142277 A1 | 12/2010 |

OTHER PUBLICATIONS

Blanding: An Assesment of Developing Dual Use Electric Actuation Technologies for Military Aircraft and Commercial Application (published on Jul. 27-Aug. 1, 1997).

(Continued)

*Primary Examiner* — Kevin Hurley
*Assistant Examiner* — Michael Stabley
(74) *Attorney, Agent, or Firm* — Jeffer Mangels Butler & Mitchell LLP; Brennan C. Swain, Esq.

(57) ABSTRACT

A walking machine that includes a chassis with an operator interface, a main controller in data communication with the operator interface, at least two leg members operatively connected to the chassis, and a power system in data communication and electrical communication with the main controller. Each leg member includes a leg control system that includes a leg microcontroller in data communication with the main controller and at least a first electro hydrostatic actuator in electrical communication with the leg microcontroller. The power system includes an electrical generator, power supply electronics in electrical communication with the electrical generator, an electrical storage medium in electrical communication with the electrical generator and in parallel with the power supply electronics, and an electrical power bus for distributing power from the power system to the leg control systems.

21 Claims, 12 Drawing Sheets

(56) References Cited

U.S. PATENT DOCUMENTS

| | | | |
|---|---|---|---|
| 6,422,329 B1 * | 7/2002 | Kazerooni et al. | 180/19.3 |
| 6,481,513 B2 | 11/2002 | Buehler | |
| 7,191,593 B1 | 3/2007 | Ho | |
| 7,296,496 B2 | 11/2007 | Shah | |
| 7,390,282 B2 | 6/2008 | Shah | |
| 7,598,695 B2 * | 10/2009 | Takanishi et al. | 318/568.12 |
| 7,628,766 B1 * | 12/2009 | Kazerooni et al. | 602/16 |
| 7,827,787 B2 | 11/2010 | Cherney | |
| 7,874,151 B2 | 1/2011 | Lin | |
| 7,900,446 B2 | 3/2011 | Geissler | |
| 8,138,707 B2 * | 3/2012 | Takenaka et al. | 318/568.12 |
| 8,457,830 B2 | 6/2013 | Goulding | |
| 8,945,028 B2 * | 2/2015 | Kazerooni et al. | 601/35 |
| 2007/0210739 A1 * | 9/2007 | Takenaka et al. | 318/568.12 |
| 2011/0030364 A1 | 2/2011 | Persson | |
| 2012/0233996 A1 | 9/2012 | Quinnell | |
| 2012/0260642 A1 | 10/2012 | Opdenbosch | |
| 2012/0324875 A1 | 12/2012 | Edler | |
| 2013/0000292 A1 | 1/2013 | Edler | |

OTHER PUBLICATIONS

Bo Liang, et al.: Research on Simulation of Aircraft Electro-Hydrostatic Actuator (EHA) Anti-Skid Braking System (published in Dec. 2011).

Oh: Modeling and Charactheristics Analysis of Single-Rod Hydraulic System Using Electro-Hyrostatic Actuator (published in Aug. 2012).

Trosen: Electric Actuation and Control System, Energy Conversion Engineering Conference, 1996, IECEC 96, Proceedings of the 31st Intersociety.

Chen: Micro Driving System for Robot Joint Based on Electro-Hydrostatic Actuation Technology (published in May 2012).

Beer: A Distributed Neural Network Architecture for Hexapod Robot Locomotion (published on Mar. 13, 2008).

Kaminaga: Development of backdrivable Hydraulic Joint Mechanism for Knee Joint of Humanoid Robots (published in May 2009).

Roca: Comparison of Reversible and Irreversible Actuators for Statically Stable Walking Robots from the Point of View of the Energy Consumption (published in Sep. 2006).

Kaminaga: Design of Electro-Hydrostatic Actuator for Lower Extremity Exoskeletal Power Assist Device (published in 2009).

Beer: Biologically Inspired Approaches to Robotics (published in Mar. 1997).

Truong: Self-Tuning Quantitative Feedback Theory for Parallel Force/Position Control of Electro-Hydrostatic Actuators (published in May 1992).

Nagy: A Walking Prescription for Statically-Stable Walkers Based on Walker/Terrain Interaction (published in May 1992).

Cleasby: A Novel High Efficiency Electro-Hydrostatic Flight Simulator Motion (published in 2008).

Erden: Six-Legged Walking Machine: The Robot-EA 308 (published on Jul. 31, 2006).

Farong: Study on Time Lag of Vehicle Suspension Control Based on EHA (published in Apr. 2008).

Kar: Design of Statically Stable Walking Robot: A Review (published on Nov. 14, 2003).

Picking: Special Hydrostatic Bearing Reduce Simulator Actuator Friction (published in Apr. 1988).

Sherwood: Fourth-Generation Mars Vehicle Concepts (published in Sep. 1994).

\* cited by examiner

STATICALLY STABLE WALKING MACHINE AND POWER SYSTEM THEREFOR

CROSS REFERENCE TO RELATED APPLICATIONS

This application claims the benefit of U.S. Provisional Application No. 61/890,508, filed Oct. 14, 2013 and U.S. Provisional Application No. 61/900,242, filed Nov. 5, 2013, which are both herein incorporated by reference in their entireties.

FIELD OF THE INVENTION

The present invention relates to a walking machine, and more particularly to a powertrain or system for a statically stable walking machine.

BACKGROUND OF THE INVENTION

According to a study conducted by the US Army in 1967, approximately half of the world's landmass or terrain is inaccessible to wheeled or tracked vehicles. However, legged animals and people generally have no issues accessing these areas. Accordingly, walking machines have been developed for accessing such terrain.

Many previous walking machines possess the same system level hydraulic architecture. These machines use a prime mover (usually an internal combustion engine) to drive a hydraulic pump that is fed from a reservoir of hydraulic fluid, which is then pumped to a series of control valves that control hydraulic cylinders. The fluid is then returned to the reservoir and the cycle starts again. These statically stable walking machines generally suffer from a number of short-comings: low payload vs. vehicle mass ratio, high power consumption when under low load, and general reliability and maintenance issues that arise due to having closely packaged hydraulic circuits. The present invention provides a different systems level approach to address these shortcomings. Furthermore, walking machines with traditional hydraulic systems need constant system pressure to maintain position, which consumes a significant amount of power.

SUMMARY OF THE PREFERRED EMBODIMENTS

In accordance with a first aspect of the present invention there is provided a walking machine that includes a chassis with an operator interface, a main controller in data communication with the operator interface, at least two leg members operatively connected to the chassis, and a power system in data communication and electrical communication with the main controller. Each leg member includes a leg control system that includes a leg microcontroller in data communication with the main controller and at least a first electro hydrostatic actuator in electrical communication with the leg microcontroller. The power system includes an electrical generator, power supply electronics in electrical communication with the electrical generator, an electrical storage medium in electrical communication with the electrical generator and in parallel with the power supply electronics, and an electrical power bus for distributing power from the power system to the leg control systems.

In a preferred embodiment, each leg control system includes at least a first position transducer in data communication with the leg microcontroller. Preferably, the first position transducer is associated with the first electro hydrostatic actuator. In a preferred embodiment, each leg member includes a first joint and is connected to the chassis such that it can pivot about a first axis with respect to the chassis when the first electro hydrostatic actuator is actuated. Preferably, each leg member includes a second electro hydrostatic actuator and a second joint that pivots about a second axis when the second electro hydrostatic actuator is actuated. In a preferred embodiment, each leg control system further includes at least a second position transducer in data communication with the leg microcontroller. The second position transducer is preferably associated with the second electro hydrostatic actuator. In a preferred embodiment, the first axis is generally vertical and the second axis is generally horizontal. It will be appreciated that actuation of the at least two legs defines a gait cycle. At near to all times during the gait cycle, the walking machine is preferably statically stable. In a preferred embodiment, each leg includes a ground contact position sensor in data communication with the leg microcontroller.

In accordance with another aspect of the present invention there is provided a walking machine that includes a chassis having an operator interface, a main controller in data communication with the operator interface, at least two leg members operatively connected to the chassis, and a power system in data communication and electrical communication with the main controller. Each leg member includes a leg control system that includes a leg microcontroller in data communication with the main controller, and at least one electro hydrostatic actuator in electrical communication with the leg microcontroller. The power system includes an electrical power bus for distributing power from the power system to the leg control systems. In a preferred embodiment, each leg member includes a chassis connection portion operatively connected to the chassis and that defines a first joint such that the chassis connection portion can pivot with respect to the chassis. Preferably, the first electro hydrostatic actuator for each leg member extends between the chassis and the chassis connection portion, and actuation of the first electro hydrostatic actuator causes the leg member to pivot about the first joint.

In a preferred embodiment, each leg member includes a second electro hydrostatic actuator operatively connected thereto and actuation of the second electro hydrostatic actuator causes the leg member to pivot about a second joint. In a preferred embodiment, each leg member includes a third electro hydrostatic actuator operatively connected thereto and actuation of the third electro hydrostatic actuator causes the leg member to pivot about a third joint. In a preferred embodiment, each leg member includes a fourth electro hydrostatic actuator operatively connected thereto and actuation of the fourth electro hydrostatic actuator causes the leg member to pivot about a fourth joint. Preferably, each leg member includes a femur portion pivotally connected to the chassis connection portion at the second joint, a tibia portion pivotally connected to the femur portion at the third joint, and a tarsus portion pivotally connected to the tibia portion at the fourth joint. In a preferred embodiment, each leg member includes first, second, third and fourth position transducers associated with the first, second, third and fourth electro hydrostatic actuators, respectively, and the first, second, third and fourth position transducers are each in data communication with the leg microcontroller.

It will be appreciated that the systems taught herein can be used with other types of mechanically articulating machines, earth moving machines and the like. Therefore, in accordance with another aspect of the present invention there is provided a power system for an articulating machine. The power system includes an electrical generator, power supply electronics in electrical communication with the electrical generator, an electrical storage medium in electrical communication with the electrical generator and in parallel with the power supply electronics, and an electrical power bus for distributing power from the power system to a component control system. The component control system includes a component microcontroller and at least a first electro hydrostatic actuator. The power system is in data communication and electrical communication with a main controller, and the component microcontroller is in data communication with the main controller. The component may be an articulating arm or boom or the like.

In a preferred embodiment, the component control system includes at least a first position transducer that is in data communication with the component microcontroller. The first position transducer is preferably associated with the first electro hydrostatic actuator. Preferably, the component control system includes at least a first motor driver in electrical communication with the first electro hydrostatic actuator.

In a preferred embodiment, instead of using conventional hydraulics that have a centralized reservoir and pump system that distributes pressurized fluid to actuators via hoses and tubing, the present invention includes an electro hydrostatic actuator (EHA). For example, see U.S. Patent Publication No. 2010/0170999, the entirety of which is incorporated herein by reference. The EHA is an electric motor packaged with a fixed displacement pump, a small reservoir of hydraulic fluid, and a series of pilot operated check valves all integrated into a traditional hydraulic cylinder. Preferably, the EHA includes an integrated motor, pump, reservoir, and valve system. Maintenance is simple as the EHAs are sealed units that can be swapped out without affecting the rest of the system. In a preferred embodiment, the only inputs to the EHA are two electrical power cables, which can also serve as the control cables as well.

Because the electric motor is directly attached to the fixed displacement pump, spinning the motor will generate hydraulic pressure in the cylinder. Because of fluid mechanics, the pressure in the cylinder will rise proportional to the load seen by the actuator. This means that the electric motor will draw current proportional to the load. Accordingly, the EHA is a "power on demand" device that consumes power based on the amount of load present. In a traditional servo-hydraulic system, the system pressure must always be maintained at a maximum, regardless of the loads seen by the hydraulic cylinder. Because of this, there is much power that is wasted as heat in a traditional servo-hydraulic system.

When the EHA is powered off, the load is carried by oil trapped between two opposing pairs of check valves in the EHA. Accordingly, when the walking machine is standing still, it consumes little to no power as the load is not being carried by the electric motors. In a preferred embodiment, the electric motors only 'see' load when the actuator is forced to move.

The present invention uses at least one EHA. It will be appreciated by those of ordinary skill in the art that through the use of EHAs and the electrical generator system discussed herein, the traditional hydraulic system components can be discarded. In a preferred embodiment, there is no central pump, reservoir, valve bank, heat exchanger, hoses or tubes. Thus, in a preferred embodiment, the system mass is reduced considerably while still achieving equivalent power output. In another embodiment, traditional hydraulic system components can be used in conjunction with EHAs.

During a typical walking cycle, the force and speed requirements can vary drastically, moving from a state of high speed and (relatively) low force during the swing phase (leg in the air) to a period of low speed and high force during the support phase (leg on the ground). The power on demand nature of the EHA draws only the power that is needed based on the load case, and, as such, the machine draws only the power to achieve the movement. In a preferred embodiment, the system automatically adjusts to varying load conditions without any type of external control loop. However, in another embodiment an external control loop can be used. This type of power use helps to increase the system efficiency drastically when compared to the prior art. In a preferred embodiment, the walking machine is relatively light and thus can carry a significant payload (when measured against its own weight).

In a preferred embodiment, each EHA is mounted to the machine with a minimum of hardware (e.g. two pins) and an electrical connection. This makes each EHA unit easily replaceable with a minimum of machine downtime. In a conventional hydraulic system, replacing an actuator would require bleeding the whole system to remove any air, as well as flushing the fluid and making sure that there was no contamination in the lines while they were open to the environment during maintenance.

In a preferred embodiment, each EHA is fluidically isolated on the machine, unlike a traditional system where actuators share a common fluid reservoir. This means that a failure of a single EHA in the system will not affect the rest of the system. The chances of several EHAs all failing at the same time on the same leg is reduced when compared to a traditional system, where a failure of one component can damage many others in the system. This gives the EHA based system an edge in total system reliability. In another embodiment some or all of the EHAs can share a common fluid reservoir or reservoirs.

In a preferred embodiment, the walking machine includes a chassis, a roll cage, an electrical system (with a generator, power supply electronics and electrical storage medium), a control assembly, and a plurality of leg members. The onboard electrical generator supplies power to a set of power supply electronics (switching power supplies) as well as an electrical storage medium (e.g., batteries or capacitors). It will be appreciated by those of skill in the art that, the electrical storage medium provides electrical power in surge situations where the power supply electronics cannot provide the needed power quickly enough. The storage medium acts as a buffer for the rest of the power supply electronics.

The electrical system provides power to each of the leg members. The power system can be used on other mechanical machines. See, for example, U.S. patent publication no. 2015/0101322, the entirety of which is incorporated herein by reference. In a preferred embodiment, the walking machine has six legs that are generally statically stable at all times during the gait cycle. However, more or less leg members are within the scope of the present invention. Each leg member includes a leg or satellite microcontroller for providing closed loop control of the leg independent of the main controller. In a preferred embodiment, this distributed approach to the control scheme allows for a more modular system, allowing for either manned or unmanned operation using the same hardware. In the preferred embodiment, a human operator will pilot the vehicle with a joystick interface similar to conventional heavy equipment. The operator interface can also be a computer keyboard, touchscreen, radio control, etc.

The leg members use EHAs for actuation of each joint. The EHAs shown herein are linear EHAs. In another embodiment, rotary EHAs can be used. Preferably, each joint also includes a transducer for measuring the position of the joint. In the preferred embodiment this transducer is a linear sensor embedded in the rod of the EHA for maximum protection and durability. However, this is not a limitation on the invention and other types of sensors/transducers can be used. In a preferred embodiment, each leg includes four degrees of freedom (four joints). However, fewer or more degrees of freedom can be employed. Preferably, each leg also contains a sensor for detecting contact with the environment. In a preferred embodiment, this sensor measures the force that the leg places on the ground. However, other types of sensors can also be used.

In a preferred embodiment, The EHAs comprise a hydraulic cylinder connected through a housing to an electric motor. The electric motor is connected to a bi-directional hydraulic pump and a hydraulic accumulator. The motor drives the pump though a series of pilot operated check valves that allow the hydraulic oil to flow to the piston. The direction of rotation and speed of the electric motor determines the speed and direction of the piston. In a preferred embodiment, the power used by the electric motor is proportional to the pressure in the hydraulic cylinder. The pressure in the hydraulic cylinder rises to meet the (static or dynamic) load placed on the system. Thus, preferably, the EHA draws only the power it requires to move the load and not more. The pilot operated check valves support the load when the motor is not spinning, and thus the EHA consumes little to no power when supporting a static load.

In a preferred embodiment, the operator of the walking machine provides inputs on desired direction, speed, step height, gait (number of legs on the ground), and other parameters via the operator interface. The operator interface can be a variety of interfaces, such as joysticks computer keyboards, touchscreens, radio controls, etc. In an embodiment, the operator does not need to be physically present at the machine in order to issue commands to the main controller. In other words, the operator can operate the machine and issue commands to the main controller remotely.

The main controller is connected to the main power system and leg controllers via a communication bus. The main power system preferably comprises an electrical generator, coupled to power supply electronics and an electrical storage medium. Typically, the power supply electronics will take the form of a switching power supply, while the electrical storage will take the form of chemical batteries. The power supply electronics serve to supply electrical power to the machine during times of nominal load, while the electrical storage provides additional electrical power during times of high power use, such as inrush current when moving the EHAs. The main power system is also connected to the main controller and leg controllers via a power distribution bus. The communication bus can be any available industrial standard as long as it allows for reliable communication between multiple microcontrollers (CANBus, etc).

The main controller takes the operator inputs and uses the input parameters to generate a series of foot coordinates for each leg member that together will give the desired locomotion commanded by the operator. Each individual set of foot coordinates is sent to the specific leg controller as a commanded position.

In a preferred embodiment, inside the leg controller there are several parts that work together to move the leg to the commanded position. The leg microcontroller receives the global foot coordinates from the main controller as well as a few selected global variables that have been set by the operator, and then performs a series of calculations.

The leg microcontroller then issues position commands to the motor drivers, which in turn supply the needed electrical signals and power to the EHAs. The leg microcontroller applies closed loop control to the speed and position of the EHAs using the position transducers as feedback. It should be noted that, in a preferred embodiment, the EHAs and position transducers share the same mounting points, such that a displacement of the EHA results in an equal displacement of the position transducer. It should also be noted that the EHA, position transducer, and motor driver may be physically integrated into a single unit for convenience of packaging and to increase the durability of the system. The leg member will continue moving towards the commanded position until it arrives at the coordinates or a ground contact sensor positioned in or near the foot member makes contact with the ground.

If the ground contact sensor makes contact with the ground before the leg member reaches the commanded position, the leg microcontroller will stop the motion of the leg before any damage is incurred. If no ground contact is made, then the leg microcontroller commands the leg to probe various nearby coordinates until ground contact is made.

Once ground contact is made (either through arrival at the commanded position or through ground contact sensor reading), the leg microcontroller queries the positions of each joint and then reports the new foot member position back to the main controller, along with a confirmation of foot member contact with the ground. The main controller can then use these coordinates when generating new commands for each of the legs, based on the input from the operator. Because the main controller has confirmation of which legs are on the ground at any one time, static stability can be ensured without active participation by the operator.

It will be appreciated that more sensors can be added as desired to increase the capabilities of the machine, and add additional behaviors to increase the locomotion performance. It will be appreciated that in a preferred embodiment, each component (e.g., leg member) is controlled independently of the other components via the components own microcontroller. However, it will be further appreciated that each microcontroller may control only a single EHA or multiple EHAs.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
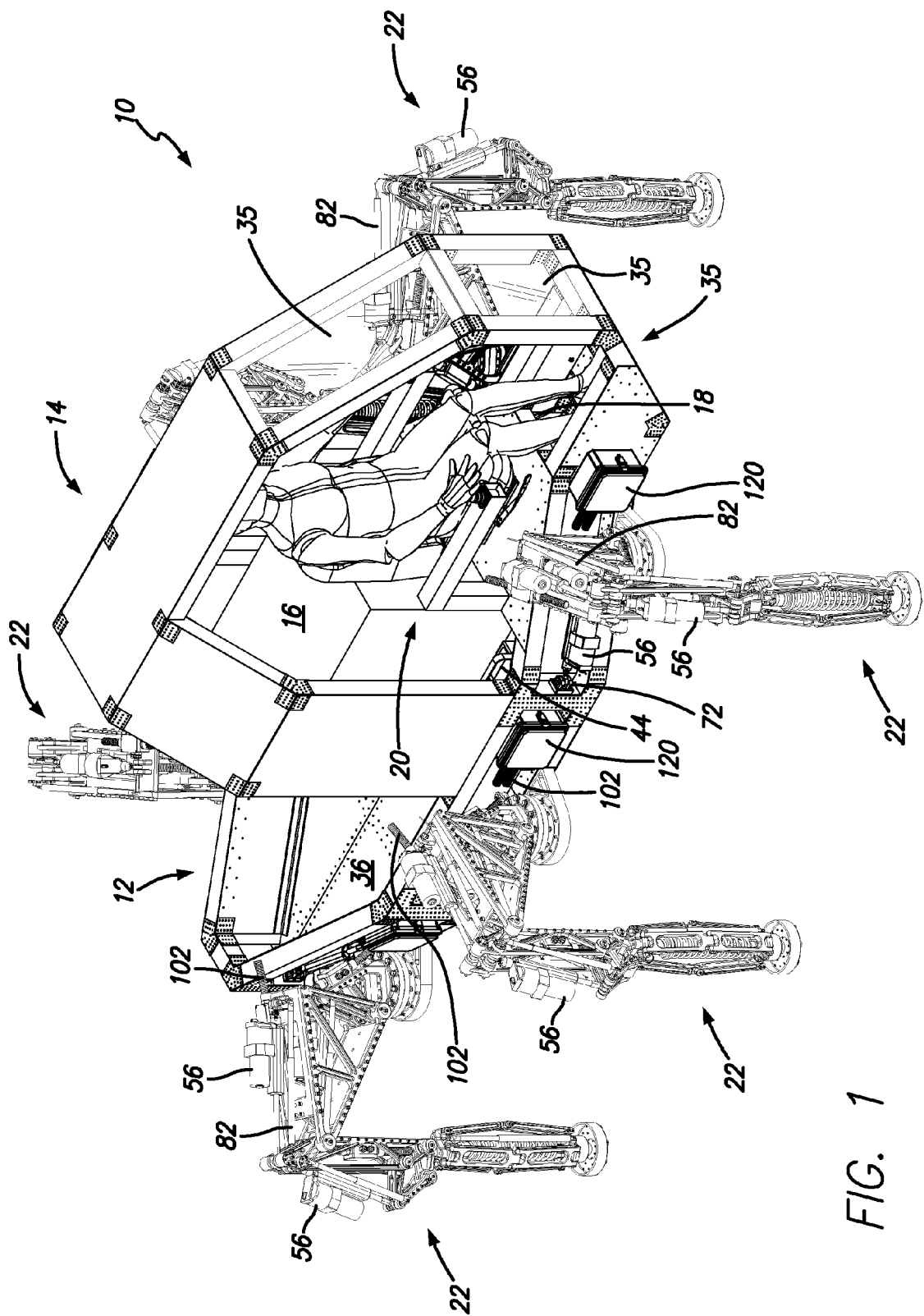
FIG. 1 is a perspective view of a walking machine in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an other embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-12 show a walking machine 10. In a preferred embodiment, the walking machine 10 includes a chassis 12, a roll cage 14, a power system 15 (including a generator 16, power supply electronics 18 and an electrical storage medium 44), a control assembly 20, and a plurality of leg members 22.

Figure 2:
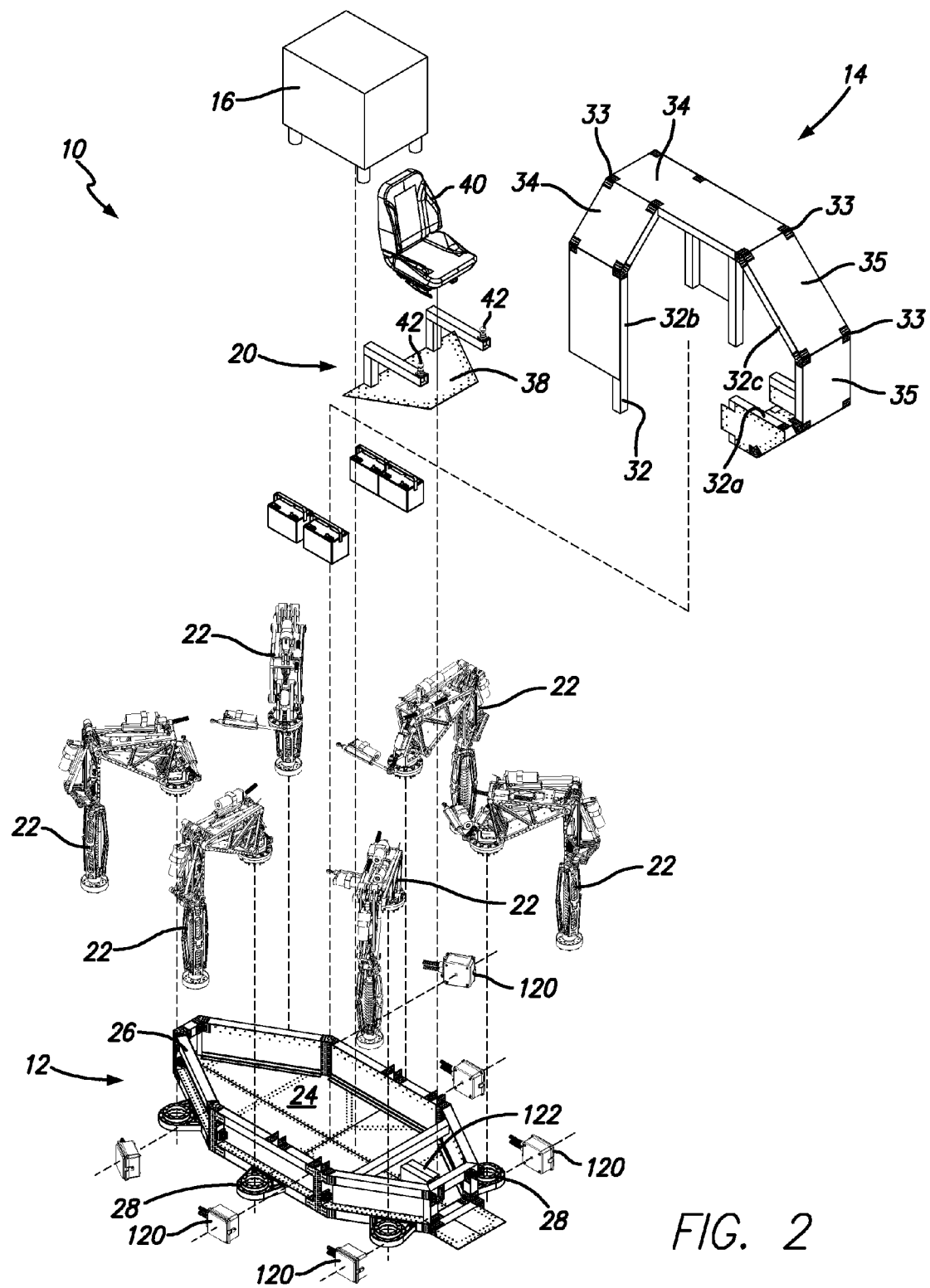
FIG. 2 is an exploded view of the walking machine.
Figure 3:
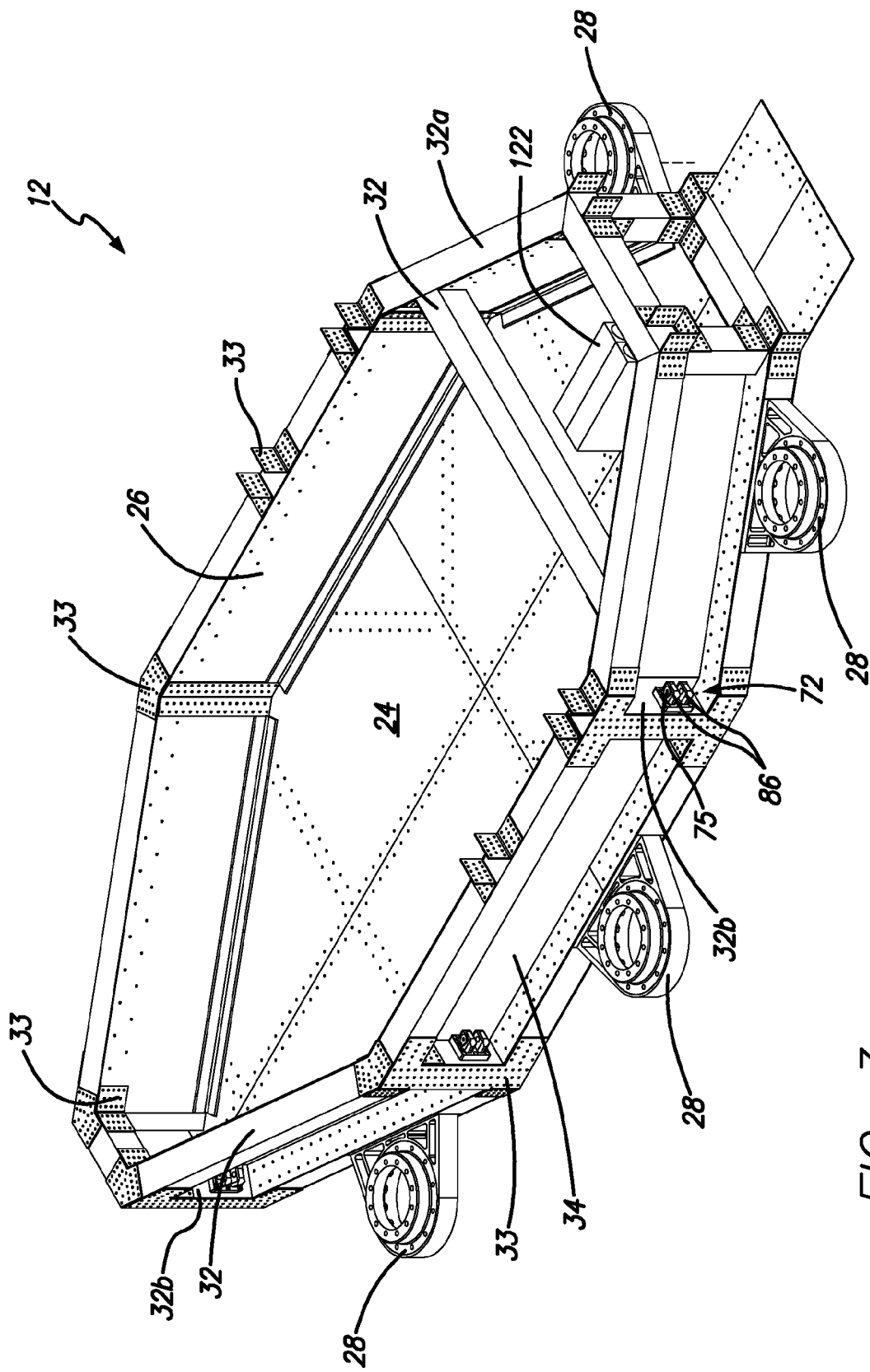
FIG. 3 is a perspective view of the chassis of the walking machine.

With reference to FIGS. 1-3 generally, the chassis 12 includes a bottom portion 24, sidewalls 26 and a plurality of leg mounting portions 28 extending outwardly from either the bottom portion 24 or the sidewalls 26. In a preferred embodiment, the chassis 12 comprises a frame 32 and plates 34 that are secured together by brackets 33, bolts and rivets and the like. Preferably, the chassis 12 includes a plurality of horizontally oriented beams 32a and vertically oriented beams 32b. Diagonally oriented beams can also be used if desired. As is shown in FIG. 2, in a preferred embodiment, the roll cage (or cab) 14 also comprises a frame 32 and plates 34 that are secured together by brackets 33, bolts and rivets and the like. The roll cage 14 includes a plurality of horizontally oriented beams 32a, a plurality of vertically oriented beams 32b, and a plurality of diagonally oriented beams 32c. Preferably, the roll cage 14 also includes at least one window 35. As shown in FIG. 1, in a preferred embodiment, upper, middle and lower windows 35 are included. It will be appreciated by those of skill in the art that the chassis 12 and/or roll cage 14 can be any desired shape and can be assembled using any type of known method, such as using threaded fasteners, adhesives, welds and the like. It will be appreciated that the plates 34 (for example, on the roll cage 14) can be omitted. As shown in FIG. 1, in a preferred embodiment, the walking machine 12 includes a payload area or bed 36.

In the preferred embodiment, the control assembly 20 includes a platform 38 that accommodates a seat 40 and a joystick interface 42 or the like. Preferably, a human operator pilots the walking machine 10 using the joystick interface 42 similar to conventional heavy equipment. It will be appreciated that other operator interfaces can be used. For example, controls similar to those in other similar sized machines (e.g., excavators, bulldozers, cranes, etc.) can be implemented for operating the walking machine 10. As shown in FIG. 1, the platform 38 is positioned above the power supply electronics 18. However, this is not a limitation on the invention and the power supply electronics 18 can be positioned elsewhere.

With reference to FIGS. 4-8, the leg members 22 will now be described. Each leg member 22 preferably includes a femur portion 46, a tibia portion 48 and a tarsus portion 50, that are connected by a plurality of joints or pivots (described below), as well as a foot portion 52 and a knuckle assembly or chassis connection portion 54. In a preferred embodiment, each leg member 22 includes a plurality of EHAs 56. In the most preferred embodiment, each leg member 22 includes four EHAs (first EHA 56a, second EHA 56b, third EHA 56c and fourth EHA 56d). However this is not a limitation on the present invention and more or fewer EHAs can be used. It will be appreciated that the EHAs will be referred to generally herein as numeral "56".

Figure 5:
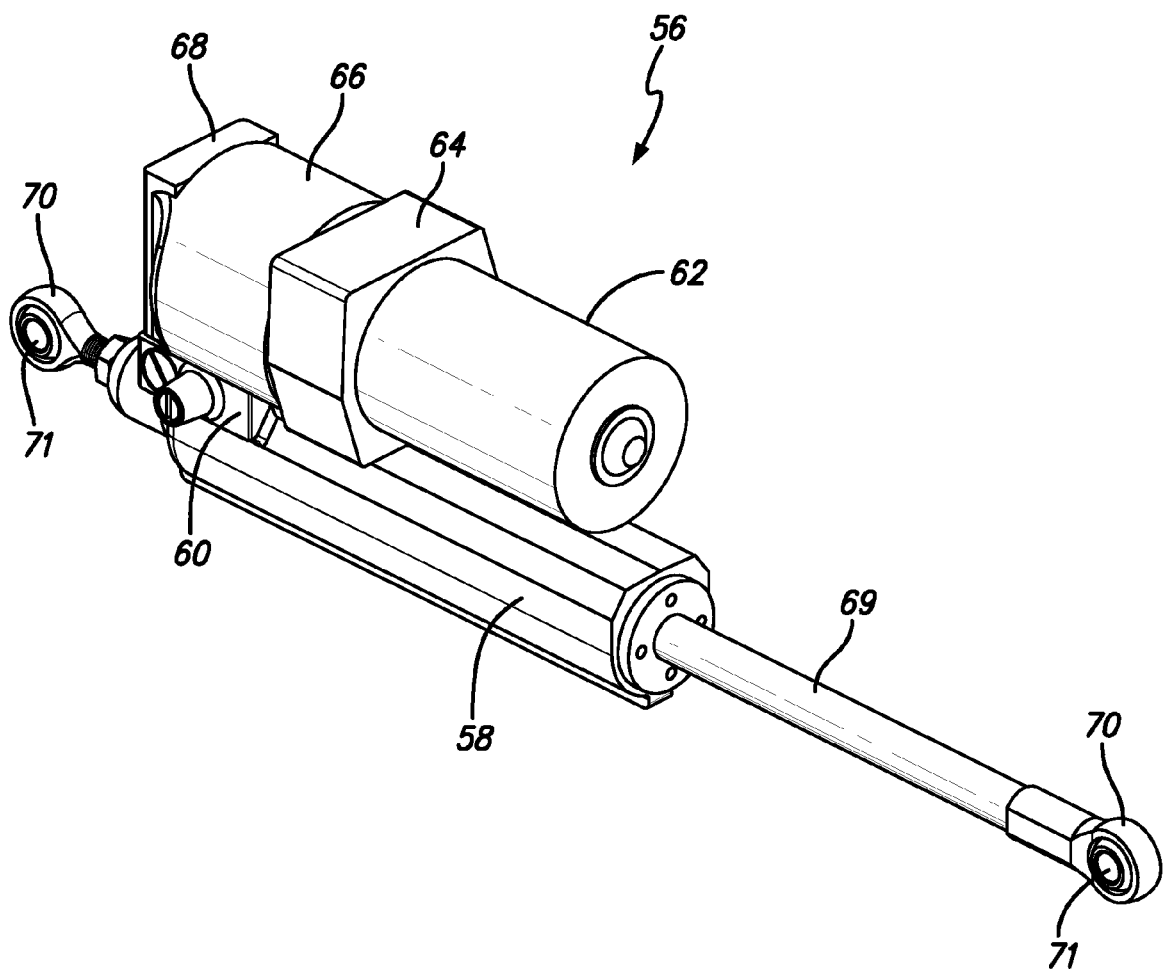
FIG. 5 is perspective view of one of the electro hydrostatic actuators of the walking machine.

As shown in FIG. 5, each EHA 56 includes a hydraulic cylinder 58, connected through a housing 60 to an electric motor 62. The electric motor 62 is connected to a bi-directional hydraulic pump 64 and a hydraulic accumulator 66.

The motor 62 drives the hydraulic pump 64 through at least one of and preferably a series of pilot operated check valves 68 that allow hydraulic oil to flow a piston within the hydraulic cylinder 58. A rod 69 extends out of the cylinder 58 and includes a connector 70 having an opening 71 therein on an end thereof. The rod 69 moves axially as a result of the interaction of the piston and hydraulic fluid within the cylinder 58. Another connector 70 extends from the opposite end of the cylinder 58. An EHA such as those made by Parker Hannifin Corporation can be used.

In a preferred embodiment, the first EHA 56a controls the slew, the second EHA 56b controls the femur portion 46, the third EHA 56c controls the tibia portion 48, and the fourth EHA 56d controls the tarsus portion 50. The first EHA 56a of each leg member 22 is connected between an EHA connection assembly 72 on the chassis connection portion 54 and an EHA connection assembly 72 on the chassis 12 that is preferably mounted on a vertically oriented beam 32b. The EHA connection assemblies 72 each include two spaced apart knuckles 86 having openings 75 therein through which a pivot pin 84 extends. The connectors 70 are each received in the space between the knuckles 86 and a hinge pin or pivot pin 84 is received through the openings 75 and 71 to connect the components together.

It will be appreciated that during use, the direction of rotation and speed of the electric motor 62 of each EHA 56 determines the speed and direction of the piston. The power used by the electric motor 62 is proportional to the pressure in the hydraulic cylinder 58. The pressure in the hydraulic cylinder 58 rises to meet the (static or dynamic) load placed on the system. Thus, the EHA 56 draws only the power it requires to move the load and preferably not more. The pilot operated check valves 68 support the load when the motor 62 is not spinning, and thus the EHA 56 consumes little to no power when supporting a static load. This drastically lowers the power requirements for the machine 10 during the support phase during the walking cycle.

Figure 4:
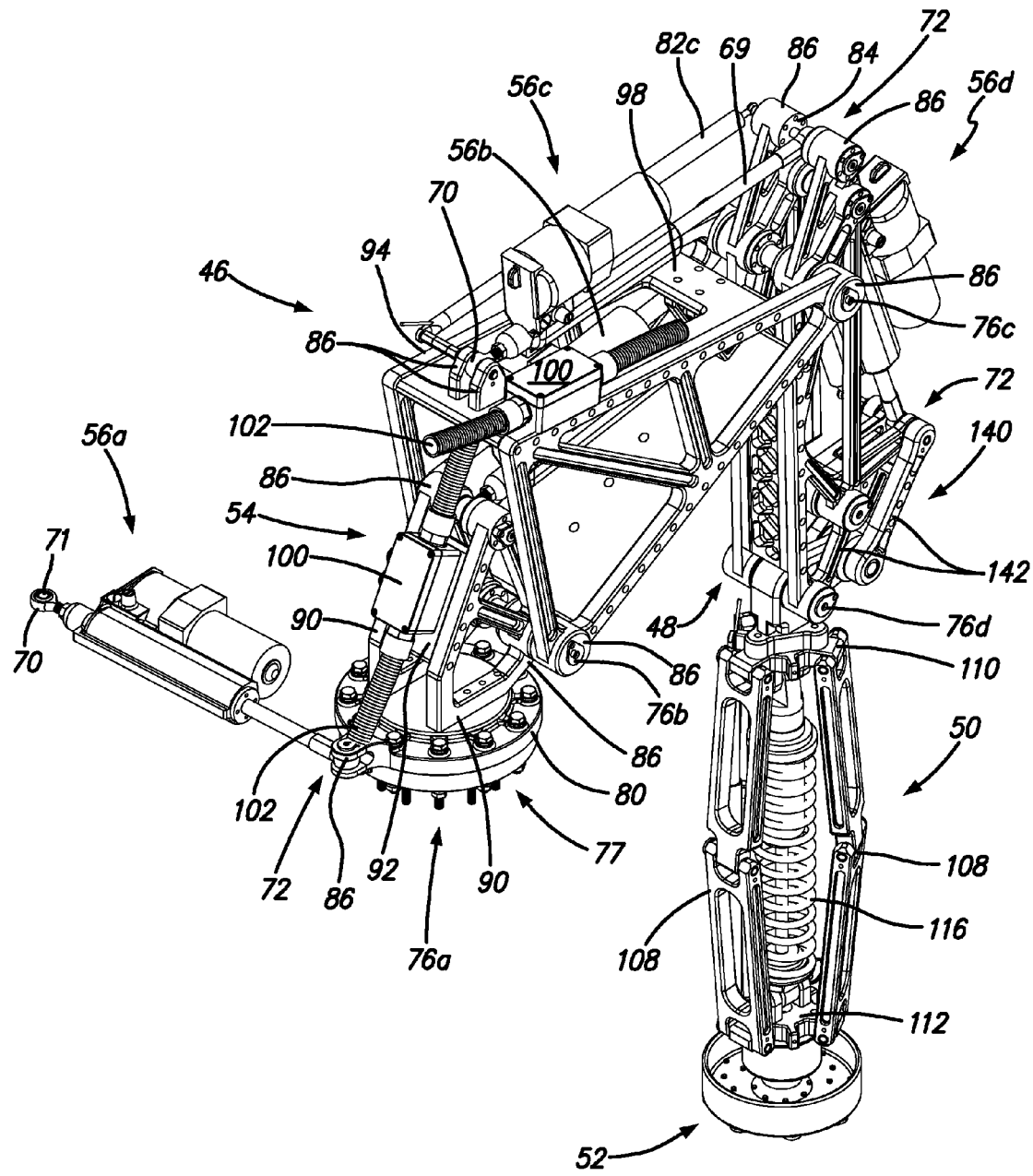
FIG. 4 is a perspective view of one of the leg members of the walking machine.

In a preferred embodiment, each leg member 22 includes four degrees of freedom (four joints) but fewer or more degrees of freedom can be used. As shown in FIG. 4, in a preferred embodiment, each leg member 22 includes a slew connection or hip (first) joint 76a so that the leg members 22 can pivot about a generally vertical axis and second, third and fourth joints 76b, 76c and 76d that allow the components of the leg members 22 to pivot about generally horizontal axes. In another embodiment, the hip joint 76a can be non-vertical or angled with respect to the vertical. In another embodiment, joints 76b, 76c and 76d can be non-horizontal or angled with respect to the horizontal. It will be appreciated that there can also be a joint between the tarsus portion 50 and the foot portion 52.

The slew connection or hip joint 76a includes a slewing ring bearing 77 that is part of the chassis connection portion 54 and that includes concentric inner (not shown) and outer 80 rings, one of which is stationary (e.g., the inner ring) and the other which can rotate (e.g., the outer ring 80) with respect to the other. The slewing ring bearing 77 is mounted on the slewing ring mount 30. The slewing ring mount 30 is cylindrically shaped and includes through holes 30a for securing the slewing ring bearing thereon (using bolts or the like). This provides the first degree of freedom of each leg member 22, joint 76a.

As shown in FIG. 4, in a preferred embodiment, the second degree of freedom is provided by a femur (second) joint 76b, the third degree of freedom is provided by a tibia (third) joint 76c, and the fourth degree of freedom is provided by a tarsus (fourth) joint 76d. Each of the joints include opposing knuckles 86 with openings 85 that include a pivot pin 84 extending therethrough. The pivot pins 84 can include flanges or washers 88 thereon and associated components, for securing the pivot pins 84 within the knuckles 86.

Figure 6:
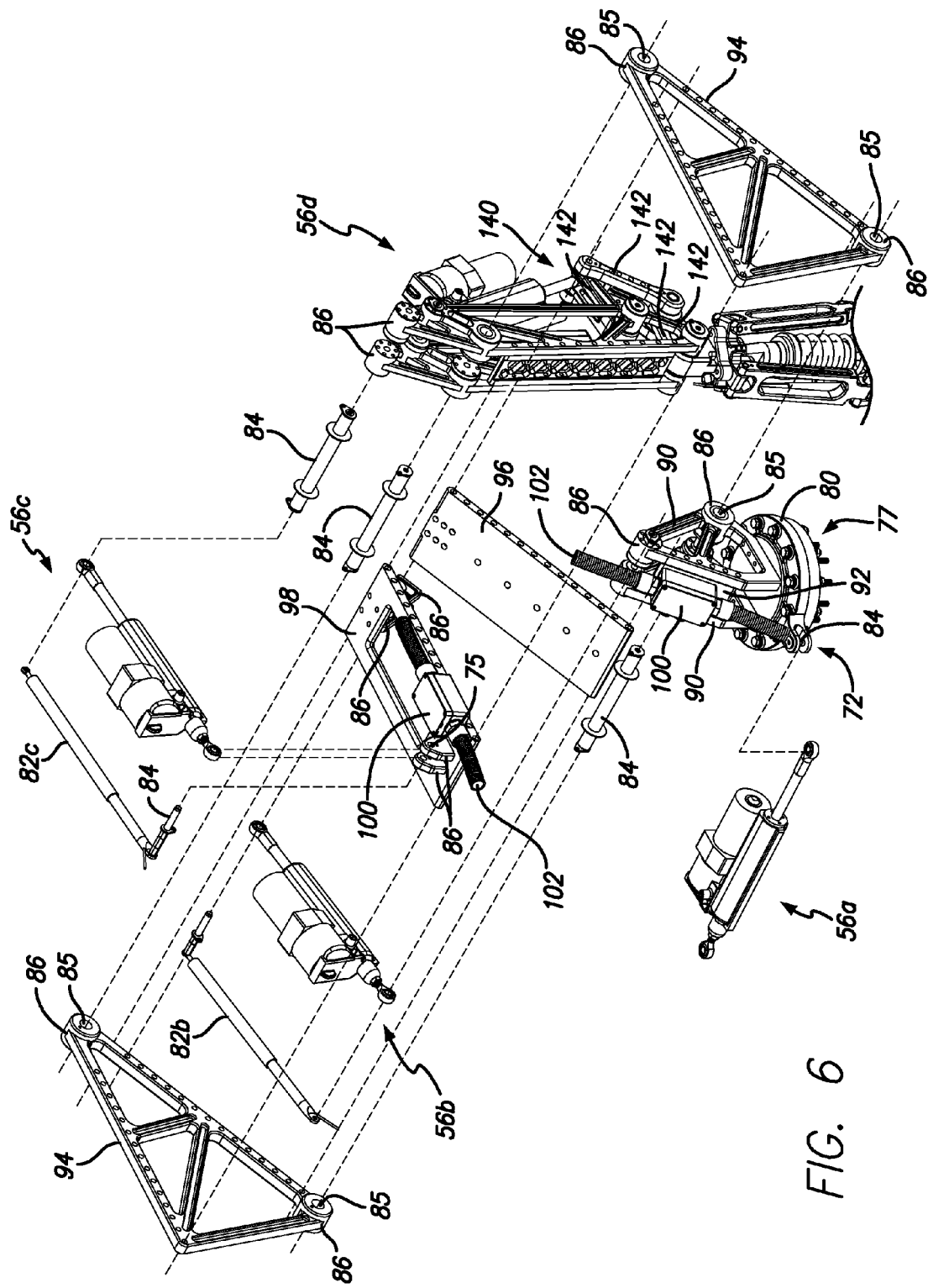
FIG. 6 is an exploded view of the femur portion of one of the leg members of the walking machine.

With reference to FIGS. 4 and 6, in a preferred embodiment, the chassis connection portion 54 includes the slewing ring bearing 77 discussed above, and opposing braces 90 that include knuckles 86 that are part of the femur joint 76b and knuckles 86 that are part of one of the EHA connection assemblies 72 for the second EHA 56b. The chassis connection portion 54 also includes a plate 92 extending between the opposing braces 90.

As shown in FIGS. 4 and 6, femur portion 46 includes opposing braces 94 and lower and upper femur plates 96 and 98 that are secured together via bolts, screws, rivets or the like. It will be appreciated that, for clarities sake, many of the threaded fasteners in the legs have been omitted in the drawings. In a preferred embodiment, the upper femur plate 98 includes knuckles 86 on the top thereof that are part of one of the EHA connection assemblies 72 for the third EHA 56c and knuckles 86 on the bottom thereof that are part of one of the EHA connection assemblies 72 for the second EHA 56b. The opposing braces 94 each include knuckles 86 thereon that are part of the femur joint 76b and the tibia joint 76c.

In a preferred embodiment, both plate 92 and upper femur plate 98 include a breakout box 100 thereon. The breakout box 100 houses or bundles all the wires that extend to the EHAs 56 and the position transducers 82 (described below). It will be appreciated that the wires have been omitted to simplify the drawings. The drawings only show partial conduits 102 extending from the breakout boxes 100 (and the electronics box 120 that house the leg microcontrollers 113 and motor drivers 130, described below). The electrical connections are described more fully below and are shown in the accompanying schematics.

Figure 7:
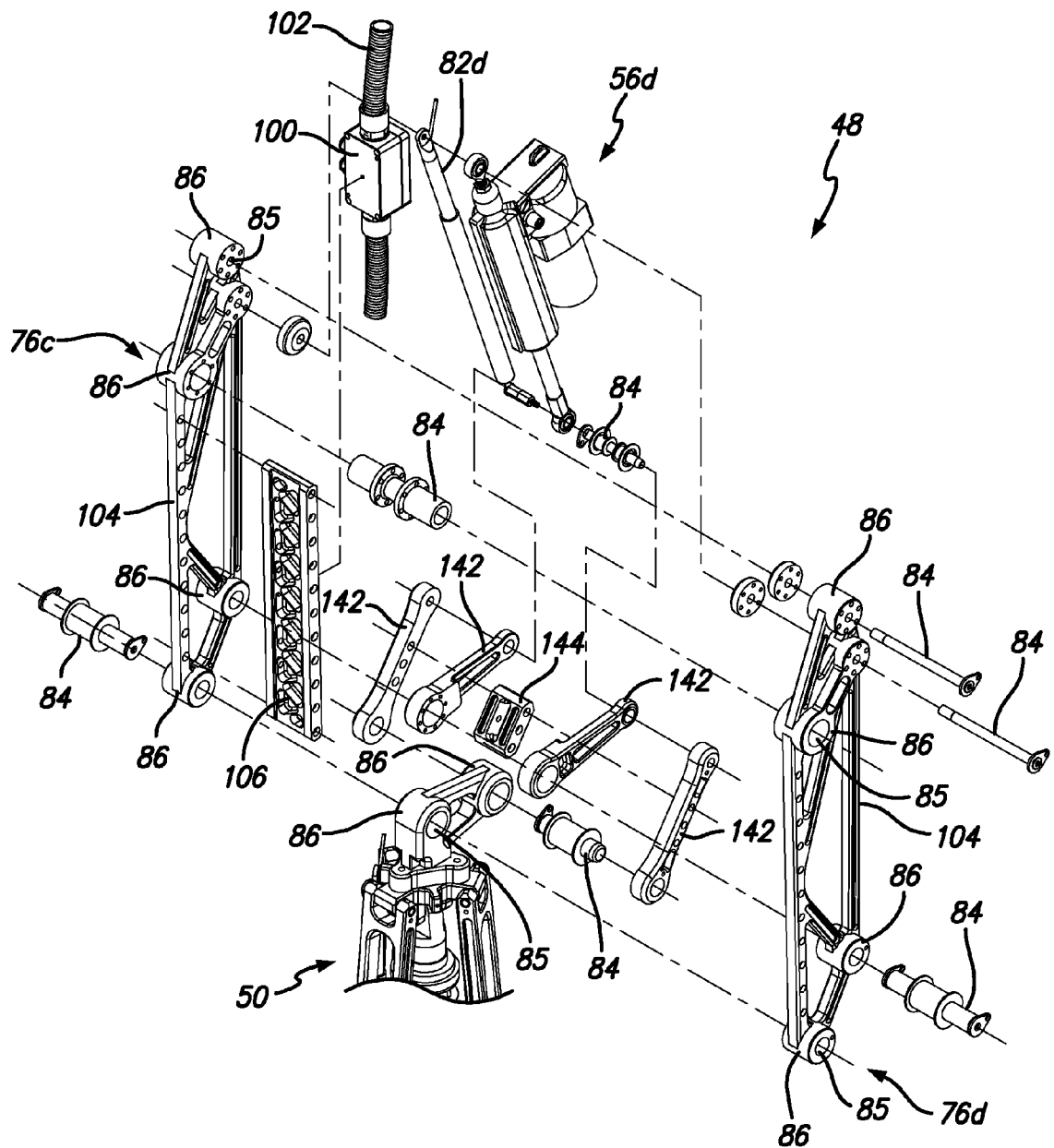
FIG. 7 is an exploded view of the tibia portion of one of the leg members of the walking machine.

As shown in FIGS. 4, 6 and 7, tibia portion 48 includes opposing braces 104 and plate 106 that are secured together via bolts, screws, rivets or the like. The opposing braces 104 include knuckles 86 that are part of one of the EHA connection assemblies 72 for the third EHA 56c and the fourth EHA 56d. In a preferred embodiment, the tibia portion 48 also includes a six bar linkage 140 to provide a desired range of motion. The six bar linkage 140 comprises portions of the braces 104 and a series of rods 142, connected by pivot pins 84 and other components (e.g., plate 144). Those of skill in the art will understand that the six bar linkage 140 includes the prismatic joint of the fourth EHA 56d and the four link rods 142.

Figure 8:
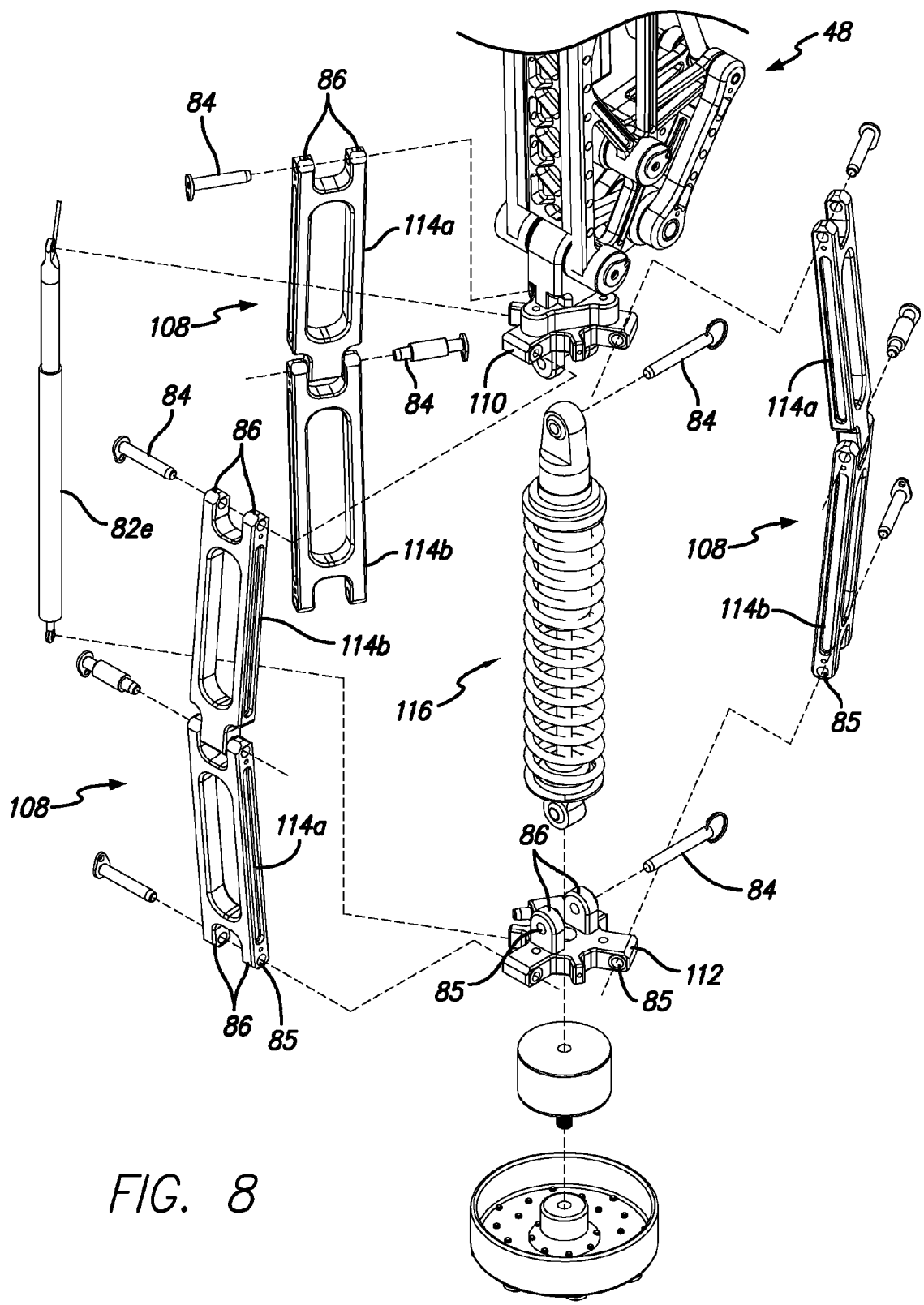
FIG. 8 is an exploded view of the tarsus portion of one of the leg members of the walking machine.

As shown in FIGS. 4 and 8, tarsus portion 50 includes three link portions 108 that extend between and are pivotally connected to an upper link plate 110 and a lower link plate 112. In another embodiment there can be more or less link portions. The link portions 108 each include upper and lower link members 114a and 114b that are pivotally connected to one another. In a preferred embodiment, the pivotal connections are made by pivot pins 84 that extend through openings 85 in knuckles 86 in the upper and lower link members 114a and 114b and the upper and lower link plates 110 and 112. In a preferred embodiment, the tarsus portion 50 also includes a damper 116 that extends between the upper and lower link plates 110 and 112 and is at least partially surrounded by the link portions 108.

In a preferred embodiment, each leg member 22 includes one or more position transducers 82. In the most preferred embodiment, each leg member 22 includes five position transducers (first position transducer 82a, second position transducer 82b, third position transducer 82c, fourth position transducer 82*d* and fifth position transducer 82*e*). However this is not a limitation on the present invention and more or fewer position transducers can be used. It will be appreciated that the position transducers will be referred to generally herein as numeral "82". In a preferred embodiment, the first position transducer 82*a* is associated with the first EHA 56*a*, the second position transducer 82*b* is associated with the second EHA 56*b*, the third position transducer 82*c* is associated with the third EHA 56*c*, and the fourth position transducer 82*d* is associated with the fourth EHA 56*d*. Preferably, each leg member 22 includes a fifth position transducer 82*e* associated with the tarsus portion 50 and the movement of the damper 116. It will be understood that the opposite ends of each position transducer 82 are mounted on the same pivot pins 84 or is at least part of the same pivot assemblies as the opposite ends of the corresponding EHA 56.

It will be appreciated by those of skill in the art that the position transducers 82 are used for measuring the position of each joint and/or the length of the EHA 56 from pivot connection 70 to pivot connection 70. In a preferred embodiment the position transducers 82 are linear potentiometers. However, in another embodiment, the position transducers can be linear sensors embedded in the rod 69 of the EHA 56 to provide protection and durability. Other types of sensors/transducers are also within the scope of the present invention. In a preferred embodiment, position transducer 82*e* is used for detecting contact with the ground, etc. and is also referred to herein as a ground contact sensor. In a preferred embodiment, the sensor measures the force that the leg member 22 places onto the ground. Ground contact can be measured, for example, by displacement of the spring in damper 116, by a strain gage in the foot member 52, and by measuring the angle between upper and lower link members 114*a* and 114*b*. Other methods are within the scope of the present invention.

Referring now to FIGS. 9-12, generally the power system 15 provides power to a leg control system 132 associated with each of the leg members 22. Each leg member 22 includes a satellite or leg microcontroller 113 and at least one motor driver 130 that is preferably housed within an electronics box 120 for providing closed loop control of the leg member 22 independent of a main controller 122. As shown in FIGS. 1 and 2, the electronics boxes 120 that house the leg microcontrollers 113 and motor drivers 130 for each leg member 122 are secured to the chassis 12.

Figure 9:
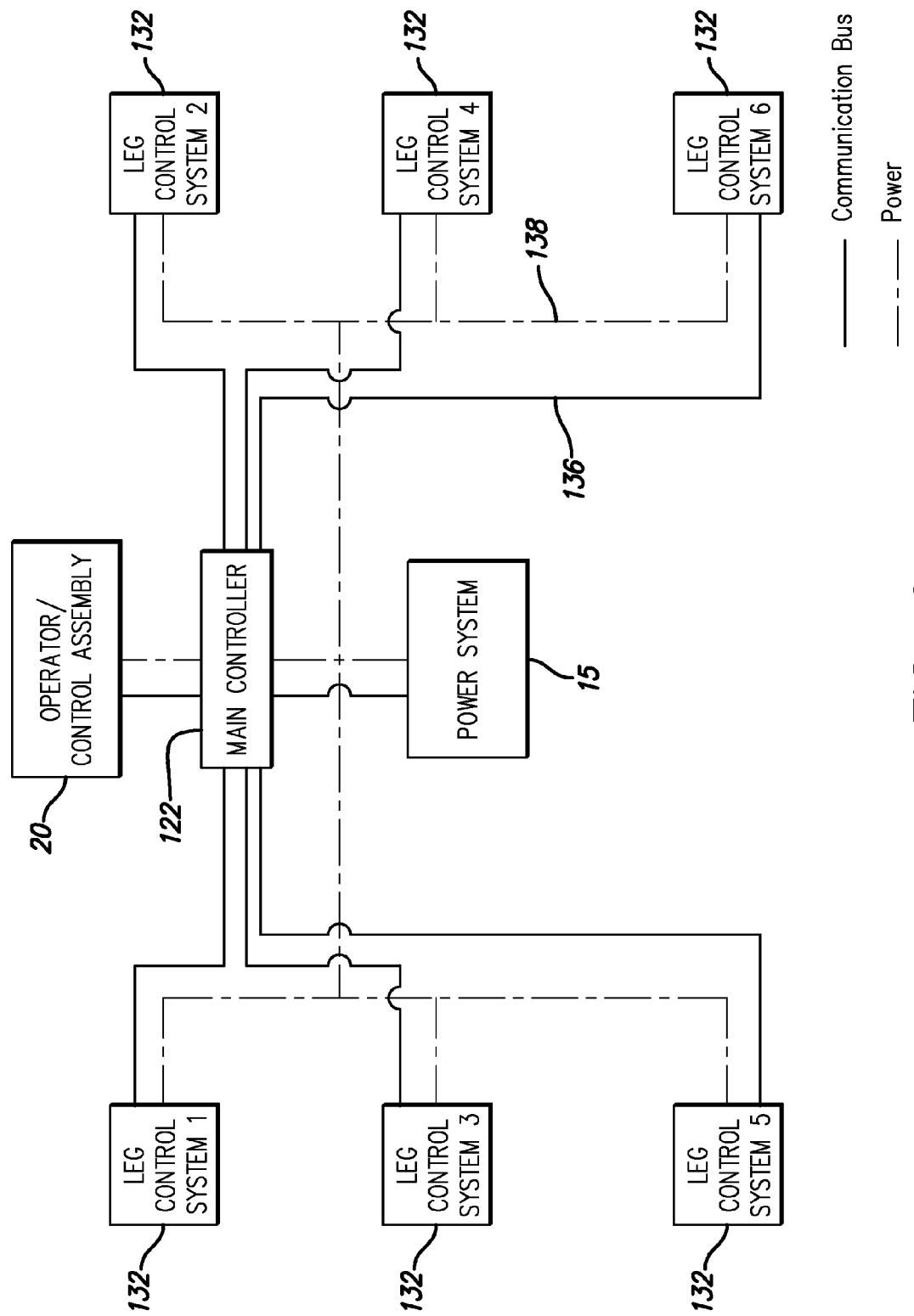
FIG. 9 is a schematic of the walking machine.

With reference to FIG. 9, in a preferred embodiment, the operator (using the control assembly 20) of the walking machine 10 provides inputs on desired direction, speed, step height, gait (number of leg members on the ground), and other parameters via the operator interface 42. In an embodiment, the operator does not need to be physically present at the machine in order to issue commands to the main controller 122. In other words, the operator can operate the walking machine 10 and issue commands to the main controller 122 remotely.

The main controller 122 is connected to the power system 15 and a plurality of leg control systems 132 (one for each leg member 22) via a data communication bus 136. The power system 15 is also connected to the main controller 122 and the leg control systems 132 via a power distribution bus 138. The communication bus 136 can be any available industrial standard as long as it allows for reliable communication between multiple microcontrollers (CANBus, etc). In a preferred embodiment, the communication bus 136 can be a cable through which a signal can be sent. However, it will be appreciated by those of ordinary skill in the art that this communication bus 136 can be any means by which a signal can be sent, including but not limited to Wi-fi, Bluetooth, fiber optics, infrared, Zigbee, etc.

Figure 11:
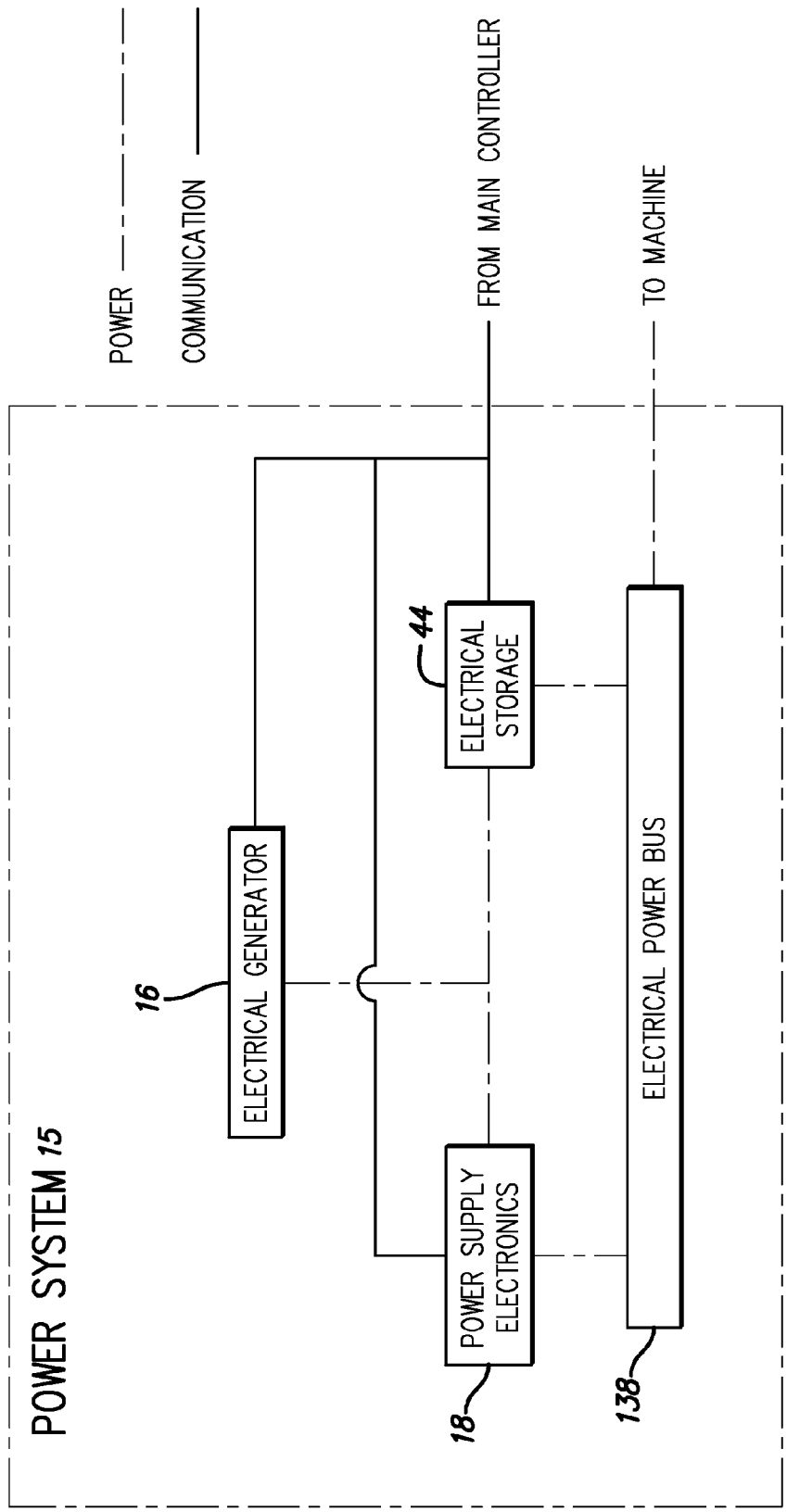
FIG. 11 is a schematic of the power system of the walking machine.
Figure 12:
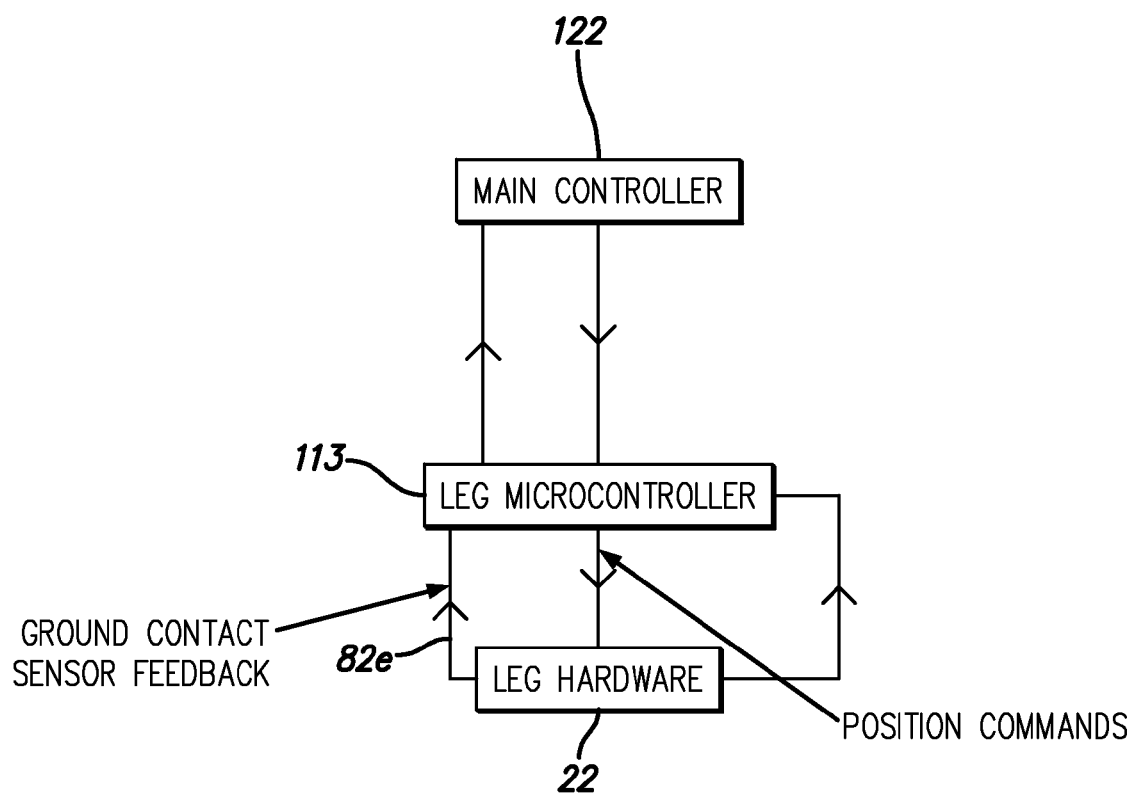
FIG. 12 is a flow chart showing the interaction of the main controller and one of the leg microcontrollers and one of the leg members of the walking machine.

As shown in FIG. 11, in a preferred embodiment, the power supply electronics 18 (e.g., switching power supplies, half-wave rectifiers, etc.) and the electrical storage medium 44 (e.g., a battery, a battery bank, capacitors, etc.) are connected to each other in parallel, and both the power electronics 18 and electrical storage medium 44 are connected to an electrical power bus 138. When necessary, the electrical storage medium 44 can provide surge power to the electrical power bus 22. At most other times, (e.g., normal operation of the machine 10), the power electronics 18 provides primary electrical power to the electrical power bus 138 (and thus the EHAs 56). The electrical generator 16 can be, for example, a microturbine generator for light weight, small size and high power density. However, any type of generator is within the scope of the present invention. The power electronics 18 could also be a full wave rectifier or some other form of inverter to convert the AC signal from the electrical generator 16 into a DC signal for the battery bank/electrical storage medium 44.

The main controller 122 takes the operator inputs and uses the input parameters to generate a series of global foot portion coordinates for each leg member 22 that together will give the desired locomotion commanded by the operator. Each individual set of foot portion coordinates is sent to the specific leg control system 132 as a commanded position.

Figure 10:
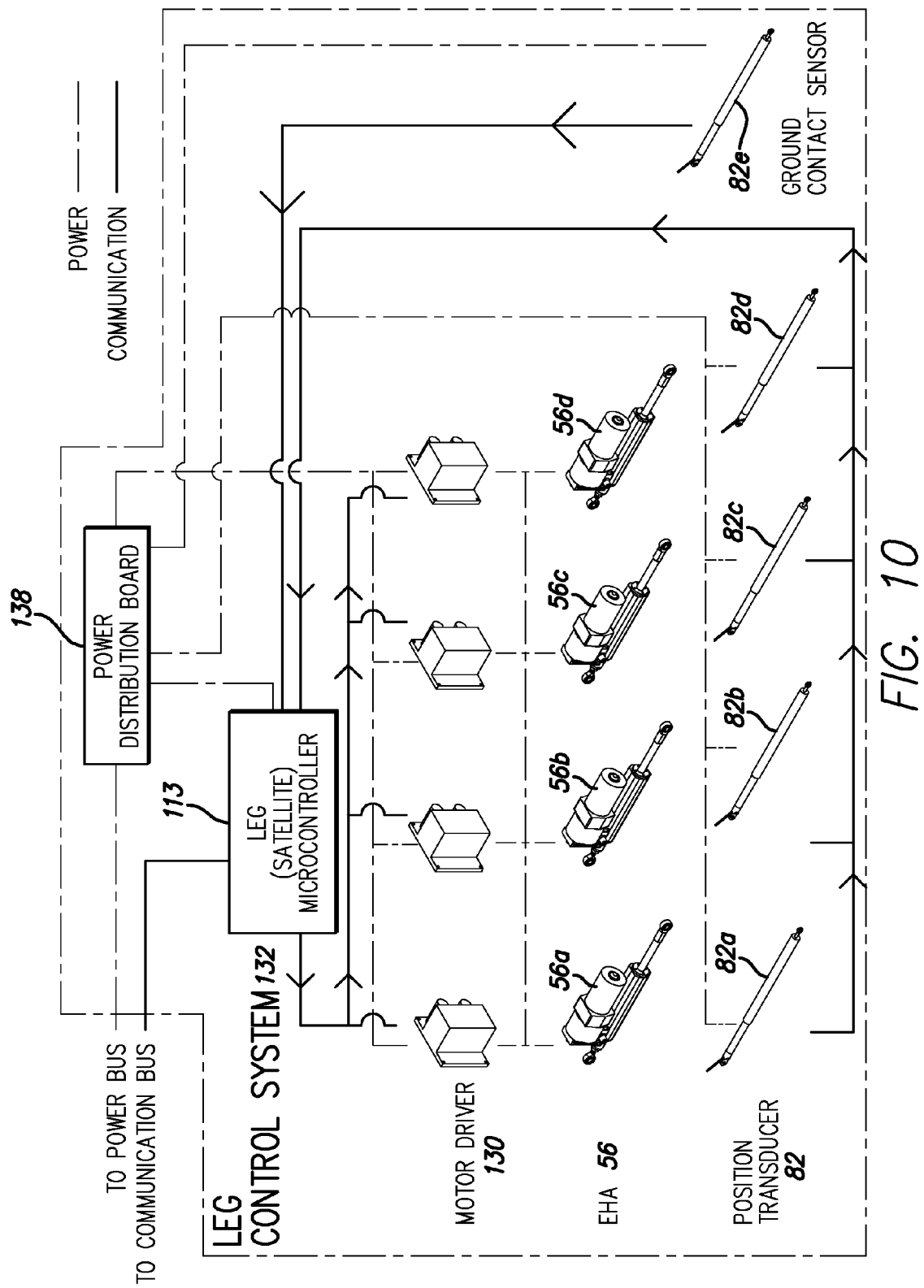
FIG. 10 is a schematic of the control system for one of the leg members of the walking machine.

With reference to FIG. 10, in a preferred embodiment, each leg control system comprises several parts that work together to move the associated leg member 22 to the commanded position. The leg microcontroller 113 receives the global foot portion coordinates from the main controller 122 as well as a few selected global variables that have been set by the operator, and then performs a series of calculations.

The leg microcontroller 113 then issues position commands to the motor drivers 130 (one for each EHA 56), which in turn supply the needed electrical signals and power to the EHAs 56. The leg microcontroller 113 applies closed loop control to the speed and position of the EHAs 56 using the position transducers 82 as feedback. It should be noted that, in a preferred embodiment, as described above, the linear EHAs 56 and position transducers (linear potentiometers) 82 share the same mounting/pivot points, such that a displacement of the EHA 56 results in an equal displacement of the position transducer 82. It should also be noted that the EHA 56, position transducer 82, and motor driver 130 may be physically integrated into a single unit for convenience of packaging and to increase the durability of the system.

In use, the leg member 22 will continue moving towards the commanded position until it arrives at the coordinates or the ground contact sensor 82*e* makes contact with the ground or senses contact with the ground. If the ground contact sensor 82*e* makes contact with the ground before the leg member 22 reaches the commanded position, the leg microcontroller 113 stops the motion of the leg member 22 to prevent damage. If no ground contact is made, then the leg microcontroller 113 commands the leg member 22 to probe various nearby coordinates until ground contact is made.

Once ground contact is made (either through arrival at the commanded position or through ground contact sensor 124 reading), the leg microcontroller 113 queries the positions of each joint, calculates the new foot portion 52 position, and then reports the new (local) foot portion 52 position back to the main controller 122, along with a confirmation of foot portion 52 contact with the ground. The main controller 122 then takes the local foot portion coordinates from each leg member 22 and transforms them back into the global coordinates that can then be used when generating new commands for each of the leg members 22, based on the input from the operator. Because the main controller 122 has confirmation of which leg members 22 are on the ground at any one time, static stability can be ensured without active participation by the operator.

The figures herein show a statically stable walking machine with six legs. It will be appreciated that more or less legs can be used. Furthermore, the figures show a generator and a series of batteries. The illustrations are not intended to be limiting, but only exemplary. Any type and number of generators and/or batteries are within the scope of the present invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A walking machine comprising:
    a chassis that includes an operator interface,
    a main controller in data communication with the operator interface,
    at least two leg members operatively connected to the chassis, wherein each leg member includes a leg control system that includes a leg microcontroller in data communication with the main controller, and at least a first electro hydrostatic actuator in electrical communication with the leg microcontroller, wherein the first electro hydrostatic actuator on each of the leg members comprises an electric motor, a pump and a fluid reservoir, and
    a power system in data communication and electrical communication with the main controller, wherein the power system includes
        an electrical generator,
        power supply electronics in electrical communication with the electrical generator,
        an electrical storage medium in electrical communication with the electrical generator and in parallel with the power supply electronics, and
        an electrical power bus for distributing power from the power system to the leg control systems.

2. The walking machine of claim 1 wherein each leg control system further comprises at least a first position transducer in data communication with the leg microcontroller.

3. The walking machine of claim 2 wherein the first position transducer is associated with the first electro hydrostatic actuator.

4. The walking machine of claim 3 wherein each leg member includes a first joint and is connected to the chassis such that it can pivot about a first axis with respect to the chassis when the first electro hydrostatic actuator is actuated.

5. The walking machine of claim 4 wherein each leg member includes a second electro hydrostatic actuator, and a second joint that pivots about a second axis when the second electro hydrostatic actuator is actuated.

6. The walking machine of claim 5 wherein each leg control system further comprises at least a second position transducer in data communication with the leg microcontroller, wherein the second position transducer is associated with the second electro hydrostatic actuator.

7. The walking machine of claim 6 wherein the first axis is generally vertical and the second axis is generally horizontal.

8. The walking machine of claim 1, wherein actuation of the at least two legs defines a gait cycle, and wherein the walking machine is statically stable during the gait cycle.

9. The walking machine of claim 2 wherein each leg includes a ground contact position sensor in data communication with the leg microcontroller.

10. A walking machine comprising:
a chassis that includes an operator interface,
a main controller in data communication with the operator interface,
at least two leg members operatively connected to the chassis, wherein each leg member includes a leg control system that includes a leg microcontroller in data communication with the main controller, and at least one electro hydrostatic actuator in electrical communication with the leg microcontroller, wherein each electro hydrostatic actuator comprises an electric motor, a pump and a fluid reservoir, and
a power system in data communication and electrical communication with the main controller, wherein the power system includes an electrical power bus for distributing power from the power system to the leg control systems.

11. The walking machine of claim 10 wherein each leg member includes a chassis connection portion operatively connected to the chassis and that defines a first joint such that the chassis connection portion can pivot with respect to the chassis.

12. The walking machine of claim 11 wherein the first electro hydrostatic actuator for each leg member extends between the chassis and the chassis connection portion, wherein actuation of the first electro hydrostatic actuator causes the leg member to pivot about the first joint.

13. The walking machine of claim 12 wherein each leg member includes a second electro hydrostatic actuator operatively connected thereto, wherein actuation of the second electro hydrostatic actuator causes the leg member to pivot about a second joint.

14. The walking machine of claim 13 wherein each leg member includes a third electro hydrostatic actuator operatively connected thereto, wherein actuation of the third electro hydrostatic actuator causes the leg member to pivot about a third joint.

15. The walking machine of claim 14 wherein each leg member includes a fourth electro hydrostatic actuator operatively connected thereto, wherein actuation of the fourth electro hydrostatic actuator causes the leg member to pivot about a fourth joint.

16. The walking machine of claim 15, wherein each leg member includes a femur portion pivotally connected to the chassis connection portion at the second joint, a tibia portion pivotally connected to the femur portion at the third joint, and a tarsus portion pivotally connected to the tibia portion at the fourth joint.

17. The walking machine of claim 16 wherein each leg member includes first, second, third and fourth position transducers associated with the first, second, third and fourth electro hydrostatic actuators, respectively, and wherein the first, second, third and fourth position transducers are each in data communication with the leg microcontroller.

18. A walking machine comprising: a chassis and at least two leg members operatively connected to the chassis, and a power system comprising:
an electrical generator,
power supply electronics in electrical communication with the electrical generator,
an electrical storage medium in electrical communication with the electrical generator and in parallel with the power supply electronics, and
an electrical power bus for distributing power from the power system to a leg control system, wherein the leg control system includes a leg microcontroller and at least a first electro hydrostatic actuator that includes an electric motor, a pump and a fluid reservoir,
wherein the power system is in data communication and electrical communication with a main controller, and wherein the leg microcontroller is in data communication with the main controller.

19. The power system of claim 18 wherein the leg control system includes at least a first position transducer that is in data communication with the leg microcontroller, and wherein the first position transducer is associated with the first electro hydrostatic actuator.

20. The power system of claim 18 wherein the leg control system includes at least a first motor driver in electrical communication with the first electro hydrostatic actuator.

21. The walking machine of claim 1 wherein the first electro hydrostatic actuators on each of the leg members are fluidically isolated from one another.

* * * * *